May 8, 1962 E. E. RITCHIE 3,033,248
PROXIMITY ELECTRONIC WATER STATION
Filed June 30, 1960 2 Sheets-Sheet 1
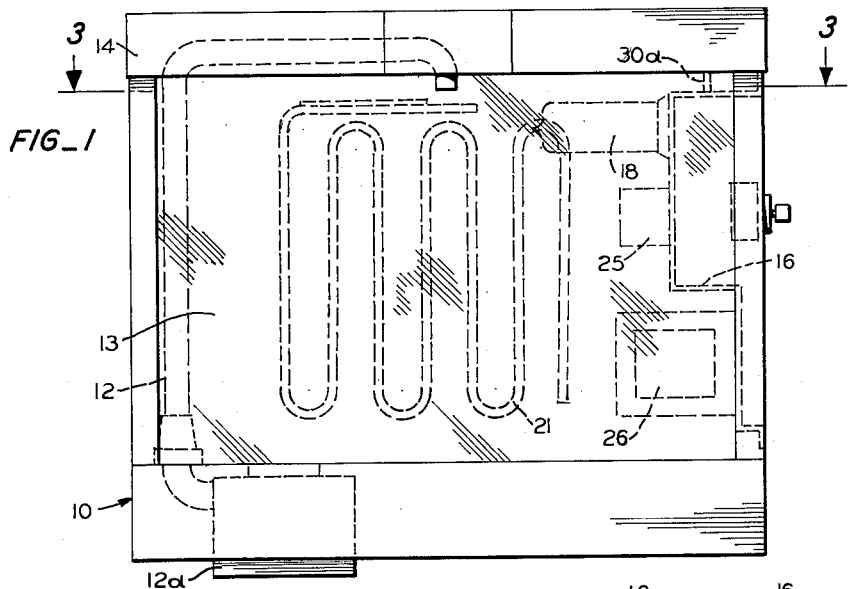
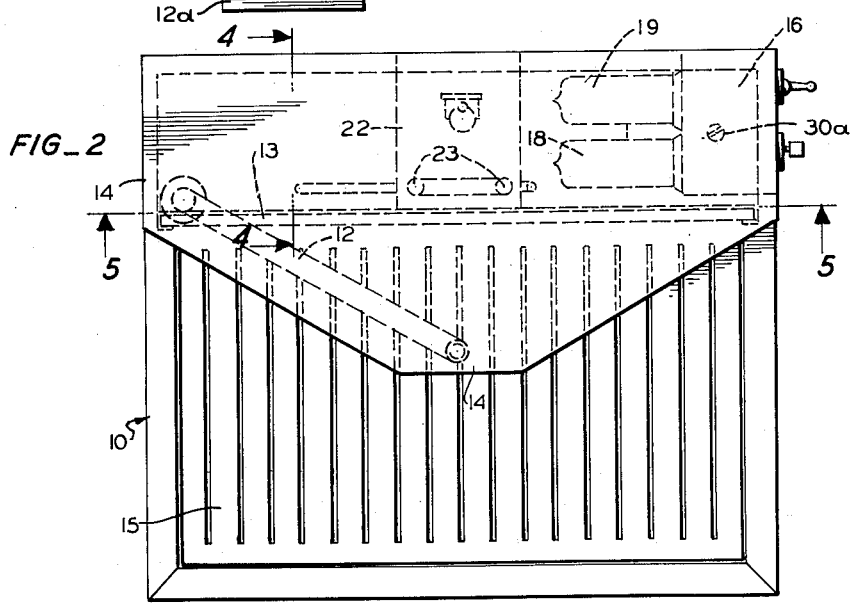
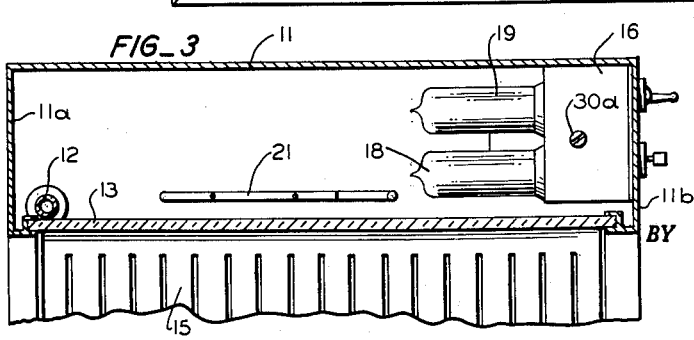
INVENTOR.
EDWIN E. RITCHIE
BY
ATTORNEYS May 8, 1962 E. E. RITCHIE 3,033,248
PROXIMITY ELECTRONIC WATER STATION
Filed June 30, 1960 2 Sheets-Sheet 2
FIG_5 FIG_4
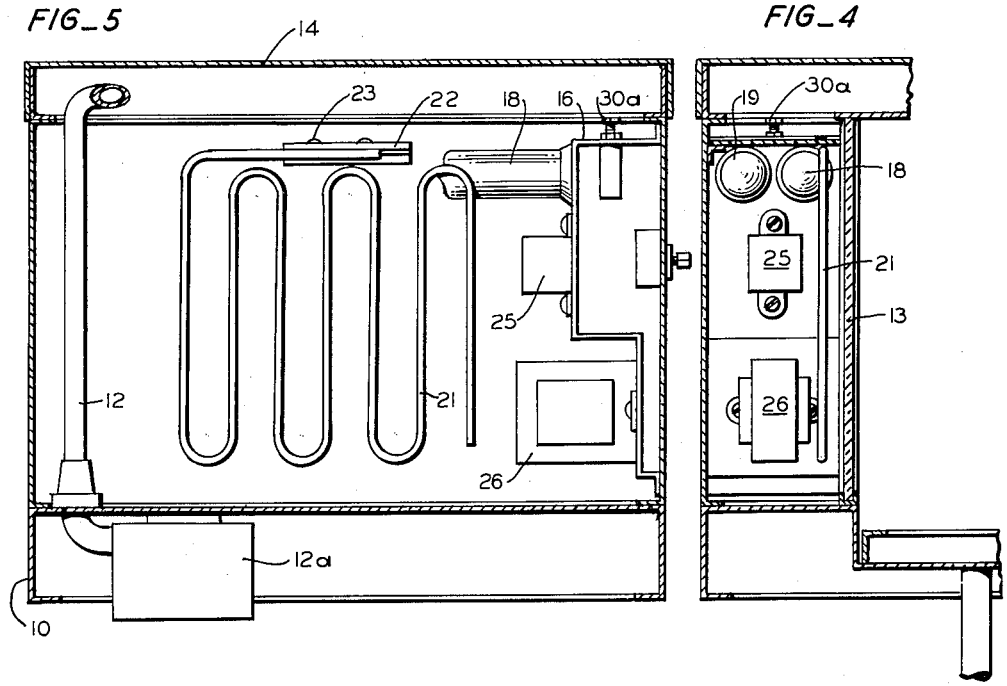
FIG_6
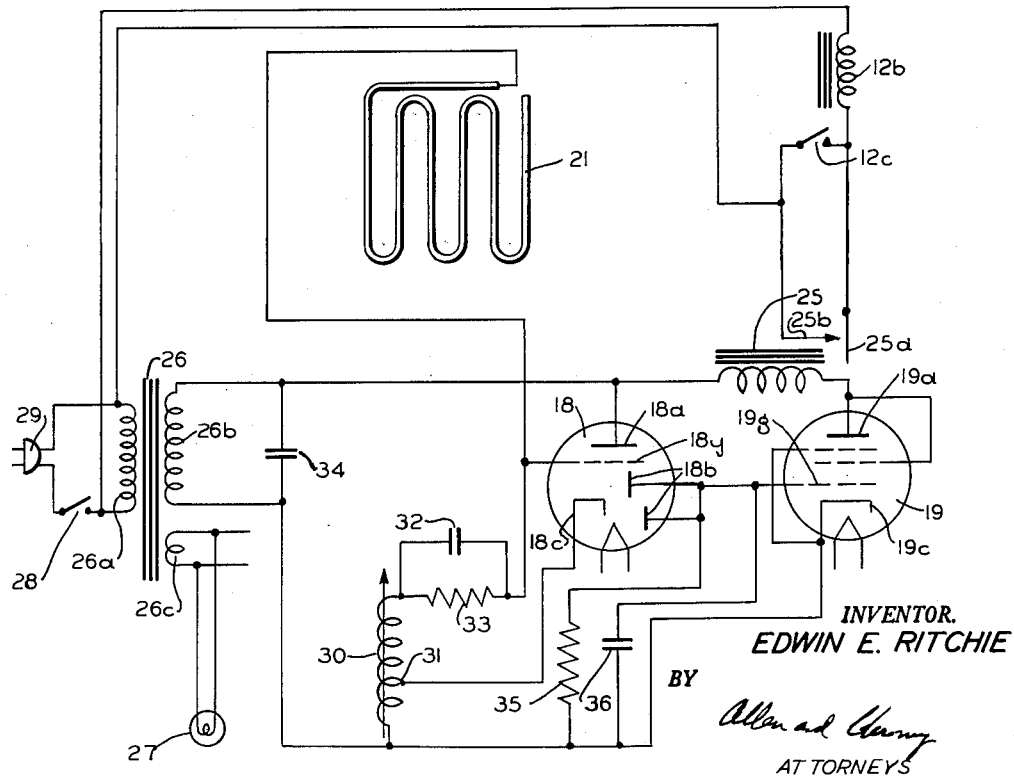
INVENTOR.
EDWIN E. RITCHIE
BY
*Allan ad Clemy*
ATTORNEYS United States Patent Office 3,033,248
Patented May 8, 1962

3,033,248
PROXIMITY ELECTRONIC WATER STATION
Edwin E. Ritchie, Bainbridge Island, Wash., assignor, by mesne assignments, to Dohrmann Sales Company, San Francisco, Calif., a corporation of Nevada
Filed June 30, 1960, Ser. No. 39,957
9 Claims. (Cl. 141—351)

This invention relates to electrically actuated and controlled water stations in general. More particularly this invention relates to a water station control employing the electrical capacity effect.

An object of this invention is to provide an improved water station control which utilizes an electronic device for automatically turning on the water supply outlet.

Another object of this invention is to provide an improved water station control in which the water supply is automatically turned on as soon as a person positions a water glass under the water nozzle.

Another object of this invention is to provide an improved water station control employing an electronic apparatus for producing an electric field adjacent to the water supply nozzle, the electronic apparatus functioning to turn on the water supply as a result of the disturbance of the electric field caused by holding or positioning a water glass under the supply nozzle.

Still another object of this invention is to provide an improved water station control that automatically supplies water as soon as a suitable container therefor is presented to the water supply outlet and functions to turn the water supply off when the container is removed.

Other and further objects of this invention will be apparent to those skilled in the art to which it relates from the following specification, claims and drawings.

In accordance with this invention, there is provided an improved water station control which functions to automatically turn the water supply on as soon as a suitable container is presented to the water supply outlet. This apparatus employs an electronic device which is provided with a suitable antenna or sensor electrode that is positioned adjacent to the water supply outlet and sets up a high frequency electric field in the immediate vicinity of that outlet. This electric field is so shaped and confined that a suitable container positioned under the water supply outlet disturbs it sufficiently with the result that the electronic apparatus effects energization of a suitable solenoid operated valve in the water supply line. Thus the solenoid valve functions to turn the water supply on to fill the container and off when the container is moved away from the water supply outlet.

Referring to the drawing briefly:

FIG. 1 is a front view of a water station embodying this invention;

FIG. 2 is a plan view of the apparatus shown in FIG. 1;

FIG. 3 is a sectional view taken along the line 3—3 of FIG. 1;

FIG. 4 is a sectional view taken along the line 4—4 of FIG. 2;

FIG. 5 is a sectional view taken along the line 5—5 of FIG. 2; and

FIG. 6 is a schematic wiring diagram of the electronic control employed in this invention.

Referring to the drawing in detail, there is shown a cabinet structure for a water station designated by the reference numeral 10. This cabinet structure includes a back wall 11, an intermediate panel 13 which may be of glass, plastic or other non-metallic material, and a top canopy and cover structure 14. The narrowed front portion of the canopy overhangs the upper part of the water supply pipe 12 which has an outlet under the forward part of the canopy 14. This outlet is substantially centrally located to the front of the panel 13 behind which the antenna or sensor element 21 is supported by means of the insulation panel 22 which is attached to the cabinet structure and to which this element is attached by the rivets or screws 23, so that it is insulated from the metal walls of the cabinet structure.

The antenna or sensor element 21 is positioned in a compartment formed by the metal back 11 and the sidewalls 11a and 11b and the top wall 14 which is also of metal. This antenna or sensor element 21 is made of a serpentine construction and comprises a series of elements folded upon each other in a definite plane. It is positioned behind the panel 13 substantially centrally disposed with respect to the water supply outlet so that the electric field projected from this element through the panel 13 permeates the space directly underneath the outlet of the water supply pipeline 12.

The electronic apparatus for energizing the antenna or sensor element 21 is mounted on the chassis 16 which is preferably of sheet metal and this electronic apparatus comprises a pair of electric discharge devices or electron tubes 18 and 19 which are of the commercial type designated as 6AT6 and 6AK6, respectively. These tubes are supported by suitable sockets positioned on the chassis 16. A suitable transformer 26 having a primary winding 26a, and a secondary winding 26b for supplying the anode current to the electron tubes 18 and 19. It also is provided with another secondary winding 26c for energizing the cathode heaters of the tubes 18 and 19 and also for energizing the pilot light 27.

The primary winding 26a is connected to the plug 29 of conventional construction whereby the transformer may be plugged into a suitable wall outlet such as is provided to conventional 110 volt lighting circuit which is used for energizing this apparatus. A suitable switch 28 which may be mounted on the outside of the cabinet structure of the water station to be actuated from the outside thereof is provided to the primary circuit. The solenoid 12b of the water valve 12a is also adapted to be energized from the 110 volt lighting circuit through the closing of the contacts of relay 25 and this solenoid is employed for opening the valve 12a. This solenoid 12b also may be energized by closing the push button switch 12c which is preferably accessible from the outside of the water station cabinet so that manual operation of the water station may be effected if desired. When automatic operation is employed, the solenoid 12b is energized through the operation of the relay 25 which is provided with a magnetic armature 25a that is adapted to close the contact 25b when the relay is energized sufficiently by the anode current supplied to the tube 19.

The tube 18 is connected as a Hartley type electrical oscillator or oscillation generator and for this purpose it is provided with a tuned circuit comprising the inductance 30 which is made variable by providing it with an adjustable core that may be adjusted by turning the member 30a to move the core in the coil 30 and thus adjust sensitivity of the grid circuit of the oscillator. The upper terminal of this coil 30 is connected to the left-hand terminals of the capacitor 32 and resistor 33 and the right-hand terminals of these elements are connected to the grid electrode 18g of the tube 18 and to the antenna or sensor element 21. The lower terminal of this coil 30 is connected to the lower terminals of the resistor 35 and capacitor 36 and to the cathode of the tube 19 as well as to the lower terminals of the secondary winding 26b and capacitor 34. The upper terminals of the secondary winding 26b and capacitor 34 are connected to the anode 18a of the tube 18 and to the left-hand terminal of the relay 25. The right-hand terminal of this relay winding is connected to the anode 19a of the tube 19. Thus the secondary winding 26b supplies plate or anode current to the tubes 18 and 19. The upper terminal of the resistor 35 is connected to the electrodes 18b of the tube 18 which supply an output signal to the grid 19g of the tube 19 when the tube 18 is generating electrical oscillations.

In operation the circuit of the tube 18 is adjusted so that this circuit generates high frequency electrical oscillations and the antenna or sensor element 21 being connected to the grid 18g of the tube 18, electrical oscillations are supplied thereto so that an electric field is set up around this element. The intensity of this electric field may be controlled and it is of sufficient intensity to extend forward from the element 21 through the panel 13. Thus when a person holding a water glass for example places this water glass under the water outlet 12 the electrical capacity of the sensor element 21 is altered so that the stability of the oscillation generator is upset and stops generating electrical oscillations. This action causes the plate current in the tube 19 to increase and as a result the current through the winding of the relay 25 increases and closes the circuit between the armature 25a and the contact 25b. The solenoid 12b of the solenoid valve 12a is energized thereby turning on the water supply to the water supply outlet 12. When the water glass is removed after it is filled with water the oscillation generator 18 resumes normal operation, that is generating oscillations as described and the current through the tube 19 is reduced so that the relay 25 interrupts the current to the solenoid valve. The valve is thereupon closed.

While I have shown a preferred embodiment of the invention it will be understood that the invention is capable of variation and modification from the form shown so that its scope should be limited only by the scope of the claims appended hereto.

What I claim is:

1. A proximity responsive electronic control apparatus for controlling a water station or the like the combination comprising a water supply outlet, a valve for controlling the water supply to said outlet, electrically energized means for actuating said valve, an electrical element positioned adjacent to said water supply outlet, means for energizing said electrical element for producing an electric field encompassing said water supply outlet, said last mentioned means including means to control the energization of said electrically energized means when said electric field is disturbed by placing a container for water under said water supply outlet.

2. A proximity responsive electronic control apparatus for controlling a water station or the like the combination comprising a water supply outlet, a valve for controlling the water supply to said outlet, electrically energized means for actuating said valve, an electrical element positioned adjacent to said water supply outlet, an oscillation generator for energizing said electrical element to produce a high frequency electric field adjacent to said water supply outlet, and means to control the energization of said electrically energized means when said electric field is disturbed by placing a container for water under said water supply outlet.

3. A proximity responsive electronic control apparatus for controlling a water station or the like the combination comprising a water supply outlet, a valve for controlling the water supply to said outlet, electrically energized means for actuating said valve, an electrical element positioned adjacent to said water supply outlet, an oscillation generator comprising an electric discharge device for generating high frequency electric oscillations, connections for connecting said electrical element to said oscillation generator to produce a high frequency electric field adjacent to said water supply outlet, and means to control the energization of said electrically energized means when said electric field is disturbed by placing a container for water under said water supply outlet.

4. A proximity responsive electronic control apparatus for controlling a water station or the like the combination comprising a water supply outlet, a valve for controlling the water supply to said outlet, an electrically energized solenoid for actuating said valve, an electrical capacity element positioned adjacent to said water supply outlet, an oscillation generator comprising an electric discharge device for generating high frequency electric oscillations, connections for connecting said electrical capacity element to said oscillation generator, and means connected to said oscillation generator to control the energization of said solenoid when the capacity of said electrical element is disturbed by placing a container for water under said water supply outlet.

5. An electronic control apparatus for controlling a water station in response to the presentation of a water receptacle to the water outlet of the station, comprising the combination of cabinet structure for a water station, a water supply outlet supported in said cabinet structure, a valve for controlling the water supply to said outlet, a sensor element, means for energizing said sensor element to set up an electric field in the immediate vicinity thereof, means for supporting said sensor element on said cabinet structure so that said electric field is adjacent to said water outlet whereby said electric field is disturbed when a water receptacle is positioned under said water outlet and means connected to said energizing means for actuating said valve to supply water to said outlet when said electric field is disturbed.

6. An electronic control apparatus for controlling a water station in response to the presentation of a water receptacle to the water outlet of the station, comprising the combination of cabinet structure for a water station, a water supply outlet supported in said cabinet structure, a valve for controlling the water supply to said outlet, a sensor element, means for energizing said sensor element to set up an electric field in the immediate vicinity thereof, said cabinet structure comprising a metal enclosure for enclosing said sensor element on all sides except the side facing said water outlet, means for supporting said sensor element on said cabinet structure so that said electric field is adjacent to said water outlet whereby said electric field is disturbed when a water receptacle is positioned under said water outlet and means for actuating said valve to supply water to said outlet when said electric field is disturbed.

7. An electronic control apparatus for controlling a water station in response to the presentation of a water receptacle to the water outlet of the station, comprising the combination of cabinet structure for a water station, a water supply outlet supported in said cabinet structure, a valve for controlling the water supply to said outlet, an electrical capacity element, an oscillation generator for supplying electrical oscillations to said capacity element to set up an electric field in the immediate vicinity thereof, means for supporting said capacity element on said cabinet structure so that said electric field is adjacent to said water outlet whereby said electric field is disturbed when a water receptacle is positioned under said water outlet and means for actuating said valve to supply water to said outlet when said electric field is disturbed.

8. An electronic control apparatus for controlling a water station in response to the presentation of a water receptacle to the water outlet of the station, comprising the combination of cabinet structure for a water station, a water supply outlet supported in said cabinet structure, a valve for controlling the water supply to said outlet, a sensor element, means for energizing said sensor element to set up an electric field in the immediate vicinity thereof, said cabinet structure comprising an enclosure for enclosing said sensor element with sheet metal except the side facing said water outlet which side is provided with a non-metallic panel, means for supporting said sensor element in said enclosure behind said non-metallic panel so that said electric field is adjacent to said water outlet whereby said electric field is disturbed when a water receptacle is positioned under said water outlet and means for actuating said valve to supply water to said outlet when said electric field is disturbed.

9. An electronic control apparatus for controlling a water station in response to the presentation of a water receptacle to the water outlet of the station, comprising the combination of cabinet structure for a water station, a water supply outlet supported in said cabinet structure, a valve for controlling the water supply to said outlet, an electrical capacity element, an oscillation generator for supplying electrical oscillations to said capacity element to set up an electric field in the immediate vicinity thereof, said cabinet structure comprising an enclosure for enclosing said sensor element with sheet metal except the side facing said water outlet which side is provided with a non-metallic panel, means for supporting said capacity element on said cabinet structure so that said electric field is adjacent to said water outlet whereby said electric field is disturbed and the generation of oscillations by said generator is interrupted when a water receptacle is positioned under said water outlet and an electric discharge device connected to said generator for actuating said valve to supply water to said outlet when generation of said electric oscillations is interrupted.

References Cited in the file of this patent

UNITED STATES PATENTS

| | | |
|---|---|---|
| 2,472,389 | Von Stoeser | June 7, 1949 |
| 2,727,670 | Shore | Dec. 20, 1955 |